United States Patent
Misra et al.

(10) Patent No.: US 8,149,687 B2
(45) Date of Patent: Apr. 3, 2012

(54) INTRA-NODE FAULT RECOVERY WITHIN A MULTI-STAGE SWITCHING ARCHITECTURE

(75) Inventors: Mohit Misra, Bangalore (IN); Jayaram Hanumanthappa, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 358 days.

(21) Appl. No.: 11/422,028

(22) Filed: Jun. 2, 2006

(65) Prior Publication Data

US 2007/0002731 A1    Jan. 4, 2007

Related U.S. Application Data

(60) Provisional application No. 60/692,551, filed on Jun. 21, 2005.

(51) Int. Cl.
*G01R 31/08* (2006.01)
*G06F 11/00* (2006.01)
*H04J 1/16* (2006.01)

(52) U.S. Cl. ...................................... 370/216

(58) Field of Classification Search .................. 370/216, 370/217, 241, 242
See application file for complete search history.

(56) References Cited

U.S. PATENT DOCUMENTS

| 5,459,715 | A  | * | 10/1995 | Furuta et al. | 370/359 |
|-----------|----|---|---------|--------------|---------|
| 7,035,204 | B1 | * | 4/2006  | Bortolotto et al. | 370/218 |
| 7,428,209 | B1 | * | 9/2008  | Roberts | 370/217 |
| 2003/0198180 | A1 | * | 10/2003 | Cambron | 370/216 |
| 2006/0083162 | A1 | * | 4/2006  | Gomez | 370/216 |

* cited by examiner

*Primary Examiner* — Chirag Shah
*Assistant Examiner* — Srinivasa Reddivalam
(74) *Attorney, Agent, or Firm* — W. Douglas Carothers; David L. Soltz

(57) ABSTRACT

A system, apparatus and method for dynamic intra node rerouting is described. In one embodiment of the invention, a multi-stage architecture within a network node is provided in which various module cards, including intermediary module cards, are interconnected within a chassis. A connection is established between a first module card and a second module card through an intermediate module card so that traffic may flow internally within the chassis. Failure detection and intra-node recovery are provided within the node by provisioning an intra-node compensated route around a failed module.

26 Claims, 8 Drawing Sheets

INTRA-NODE FAULT RECOVERY WITHIN A MULTI-STAGE SWITCHING ARCHITECTURE

CROSS REFERENCE TO RELATED PATENT APPLICATIONS

This application claims priority to U.S. Provisional Application Ser. No. 60/692,551, entitled "SINGLE NODE CROSS CONNECT RE-ROUTING", filed Jun. 21, 2005, which application is incorporated herein by reference in its entirety.

BACKGROUND

A. Technical Field

This invention relates generally to distributed multi-stage switching architectures, and more particularly, to intra-node fault recovery within a multi-stage switching architecture.

B. Background of the Invention

The importance of optical networking technology in today's society is well understood. Optical networks allow large amounts of information to be transmitted at high data rates across very long distances. The reliance on these networks by individuals and companies requires that the networks operate with minimal failures and lost data events.

In optical long haul scenarios, multiple channels or wavelengths are typically multiplexed together and inserted into a fiber optic cable that spans a long distance. The optical signal, comprising multiple wavelengths, propagates within the fiber optic cable until its destination is reached. This signal may then be demultiplexed and the individual wavelengths further processed.

Connections within an optical network may be provisioned by switching data at one or more switching nodes. The switching nodes receive data on one port and switch the data to a provisioned output port. Because of this switching capability between ports, these switching nodes may be intermediary devices in a large number of connections that form end-to-end circuits within the network.

A switching node contains a cross connect that is used to physically connect ports on the node. The cross-connect usually represents the most basic building block for constructing an end-to-end circuit. The actual connections between the ports are often provisioned across a cross connect by a user. A series of cross connect connections across multiple nodes that provides an end-to-end communication circuit is generally referred to as a sub-network connection.

FIG. 1 illustrates an exemplary sub-network connection formed by linking a set of network elements. The network elements comprise switching elements needed to switch data or voice between one of the input channel to one of the output channels. The sub-network connection links client end-1 110 to a client end-2 120 through the network nodes 131-137.

In case of a failure at any of the cross-connects within the sub-network connection, which may arise from a failure at a switching element in a particular network node, the entire connection is broken. Upon detection of such a failure, a new sub-network connection may be required so that data may once again be communicated between the transmitting and receiving ends. Typically, this newly established sub-network connection completely avoids the faulty network node entirely. For example, if a failure occurs on any of the switching elements in the network node 133, a new sub-network connection needs to be set up that avoids the faulty network node 133 completely. The new sub-network connection uses network node 139 to route around the faulty network node 133.

The failure recovery time and complexity may be significant because establishing the new sub-network connection involves setting up a series of new cross-connections through multiple networks nodes. This failure time and complexity may adversely affect the performance of the network and the clients thereon.

SUMMARY OF THE INVENTION

The present invention provides a system, apparatus and method for dynamic intra node rerouting in a network node. In one embodiment of the invention, a multi-stage switching architecture is provided that establishes a connection between a first module card and a second module card via an intermediate module card. Dynamic detecting and rerouting capabilities are provided within the network node, which allow intra-node rerouting around a failed module card.

In one embodiment of the invention, dynamic rerouting of signals between two module cards is provided through a compensated route on failure of the intermediate module card in the initial route. The compensated route avoids the faulty module card by using different cross-connects between the two module cards.

By providing fault correction at a lowest possible network level (i.e. at the intra-node level), the quick healing of network communications is provided. As a result, the complexity and recovery time of a failure is significantly reduced and the affect on network traffic is minimized.

In another embodiment of the present invention, a multi-stage switching system having method for intra-node rerouting is provided. A node controller on a network node is provided to detect a failure on one or more intermediate module cards within the node. Once a failure is detected, an intra-node compensated route is established around the failed intermediate module cards.

Rerouting of the signals between the module cards in the network node confines the error of the node within the given node. The time associated with detection of the failure and recovery is minimized. Sub-network-connections external to the failed node remain unaffected because of the intra-node compensated route.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A system, apparatus and method for dynamic intra node rerouting is described. In one embodiment of the invention, a multi-stage architecture within a network node is provided in which various module cards, including intermediary module cards, are interconnected within a chassis. A connection is established between a first module card and a second module card through an intermediate module card so that traffic may flow internally within the chassis. Failure detection and intra-node recovery are provided within the node by provisioning an intra-node compensated route around a failed module.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different network systems and devices including optical network nodes. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

Figure 1:
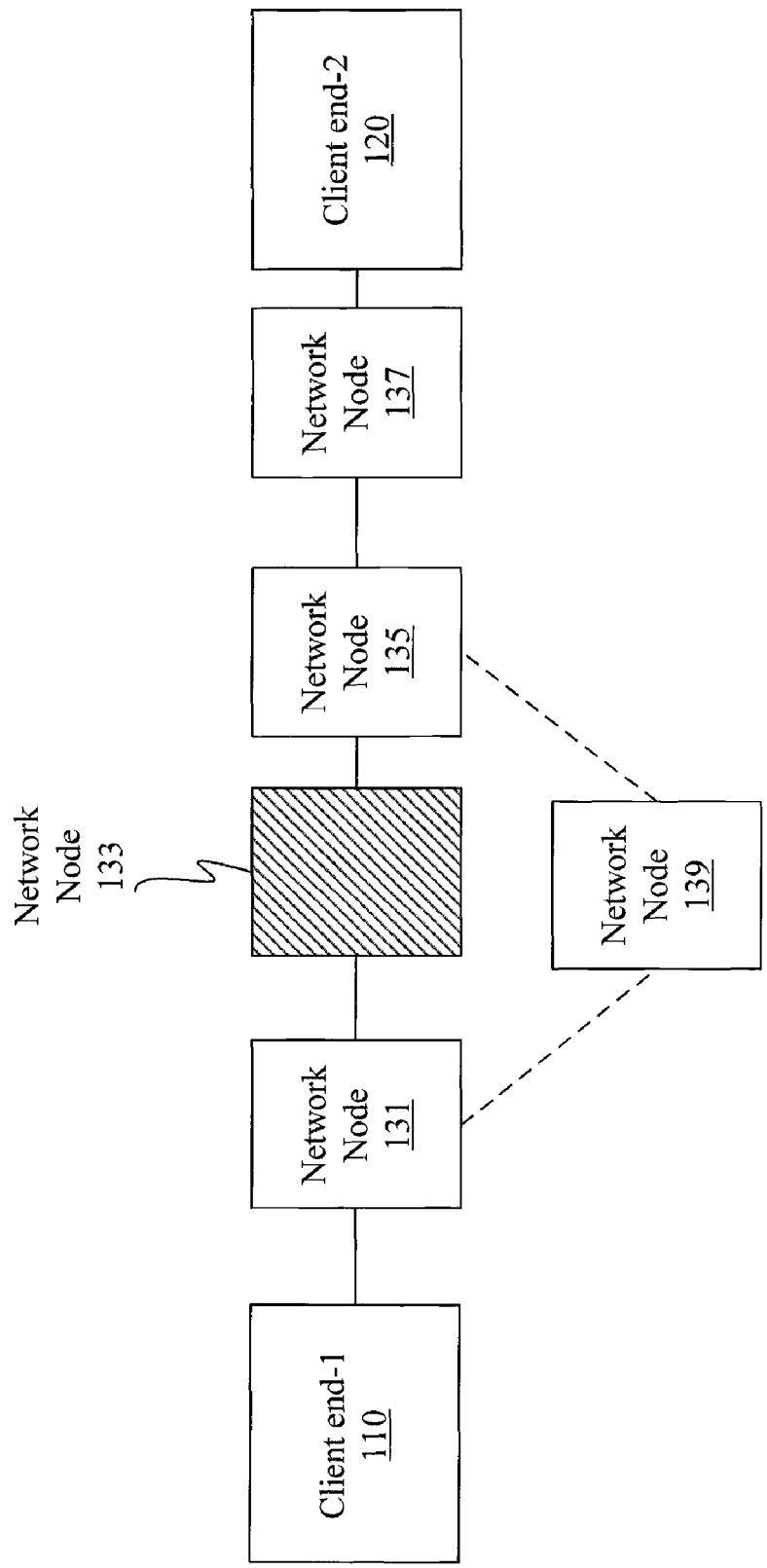
FIG. 1 shows an exemplary sub-network-connection failure recovery according to a prior art.
Figure 2:
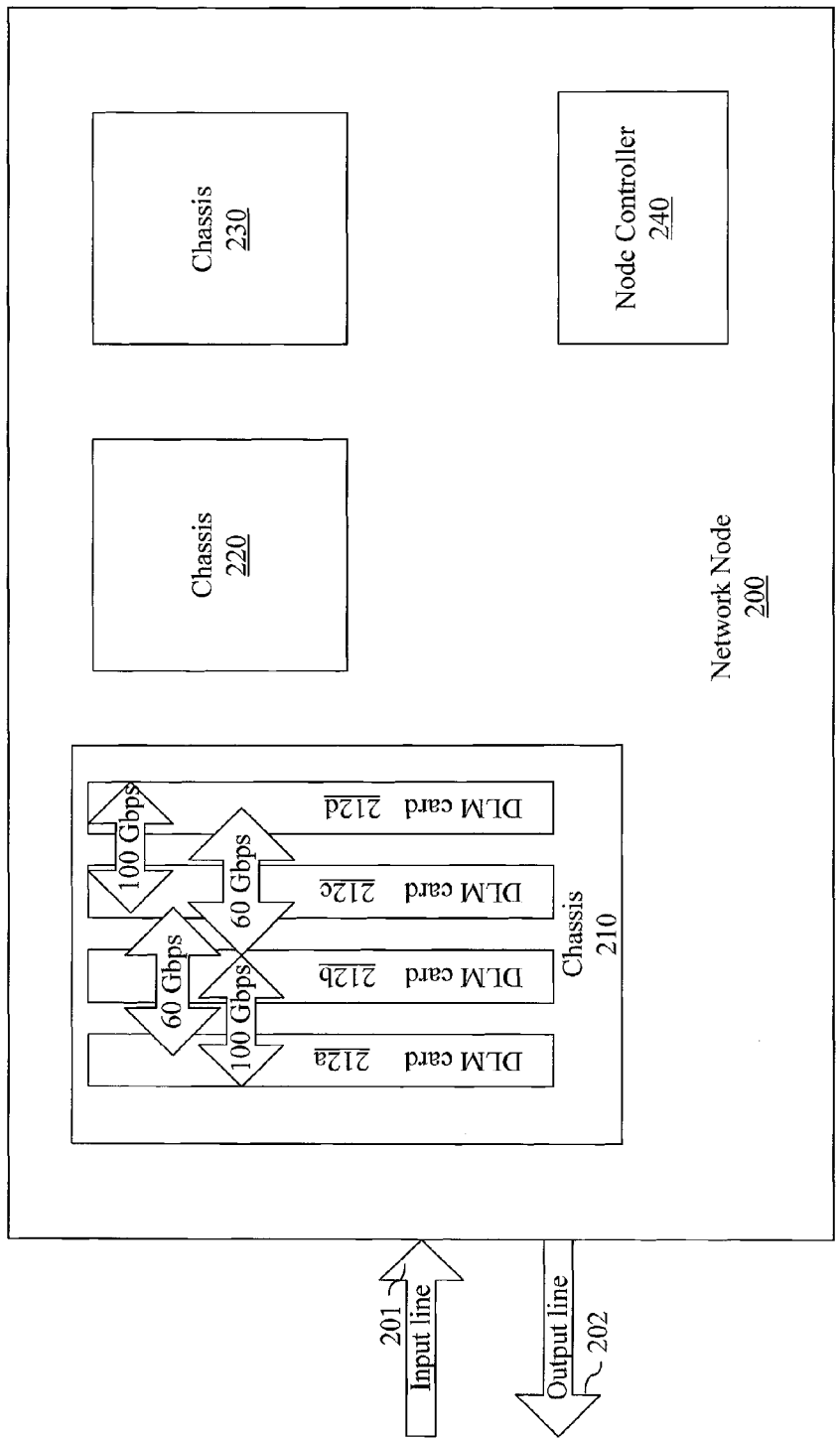
FIG. 2 shows an exemplary network node over which the method of dynamic intra node rerouting may take place according to one embodiment of the present invention.

FIG. 2 illustrates an exemplary network node over which the method of dynamic intra node rerouting takes place according to one embodiment of the invention. The network node 200 may comprise multiple chassis 210, 220, 230. For illustrative purposes, a first chassis 210 is shown having multiple internal module cards, in this example digital line module ("DLM") cards 212a-d, on which network traffic is switched.

In one embodiment, the internal module cards include DLM cards that receive and prepare a signal for transport on an optical medium, such as a fiber optic cable. DLM cards 212a, 212b, 212c, and 212d are shown in the first chassis 210, which contains slots for connecting digital line module cards within the node. For example, the DLM card 212a may be placed within a DLM slot in the chassis 210.

Bandwidth or data rates of the connections between various DLM cards may be specified. For example, the DLM card 212a may be connected to the DLM card 212c at 60 Gbps. As another example, connectivity at a rate of 100 Gbps may be provided between DLM cards 212a and 212b. One skilled in the art will recognize that the data rates between various DLM cards may be varied.

The network node 200 may form a part of a larger network. An input line 201 may be fed to the network node 200, which receives traffic from network clients. This input may alternatively receive traffic from other network nodes. An output line 202 is provided for transmission of traffic back onto the network, such as to other nodes or network clients.

Various embodiments of the invention provide for multiple potential connections between the DLM cards 212a-d. If an existing connection fails, perhaps caused by a malfunction DLM card, then a compensated route is created using remaining operative DLM cards. As a result, traffic is internally rerouted around the failed DLM card. Accordingly, failure recovery is performed in an intra node manner and is relatively transparent to other nodes within the relevant sub-network connection(s).

Figure 3:
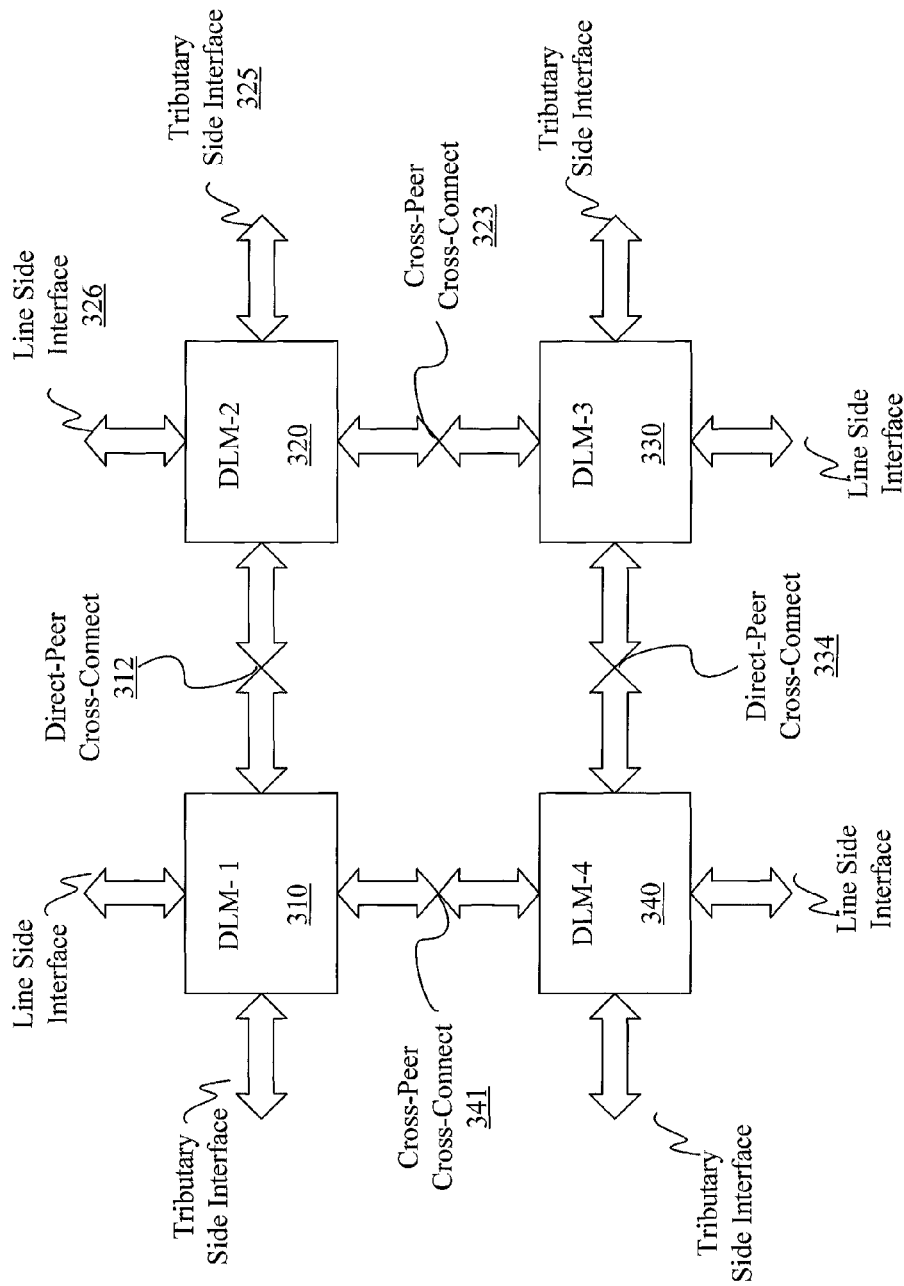
FIG. 3 shows an exemplary DLM cards interconnections according to one embodiment of the invention.

A logical view of exemplary DLM cards interconnections is shown in FIG. 3. In this example, the interconnections may implement at least two of four DLM cards connected as shown. Particularly, a digital line module card-1 310 may connect to a digital line module card-2 320 through a cross-connect. A cross-connect may be provided by linking a set of ports of one digital line module to a set of ports on another digital line module. The number of ports in the cross-connect may vary depending on the type of cross-connect that is implemented. For example, the digital line module card-1 DLM-1 310 may be connected to the digital line module card-2 320 through a set of 40 ports, thus providing for a direct peer cross-connection.

Each port in a cross-connection may correspond to a particular data rates. A direct peer cross connection 312 may provides a 100 Gbps connectivity between the digital line modules 310, 320. Alternatively, a cross peer connection between two digital line module cards may be provided at another rate. A set of 24 ports from each of digital line module cards may be interconnected together providing for a 60 Gbps connection. For example, the digital line module card-2 320 may be connected to digital line module card-3 330 through a cross peer cross-connection 323.

A digital line module card-4 340 may be connected to a digital line module card-3 330 through a direct peer cross-connection 334. The connectivity of digital line module card 310 with digital line module card-4 340 may be provided through a cross peer cross connection 341. Various module cards may be provided to connect with a combination of a direct peer cross connection or a cross-peer cross connection. This combination of cross connections allows for traffic to travel at different rates internal within the node as well as provides internal redundancy across the multiple DLM cards.

Each digital line module card may be provided with ports to provide for tributary side interface, to communicate with a client side. For example, the digital line module card-2 320 may be provided with a set of ports, which may provide a tributary side interface 325 to the client side. Another set of ports may be provided for providing a line side interface 326 of the digital line module card-2 320 to other node elements. In an exemplary embodiment, the tributary side interface may provide for a 100 Gbps connection, while the line side interface provides a 60 Gbps connection.

B. Intra Node Fault Recovery

Figure 4:
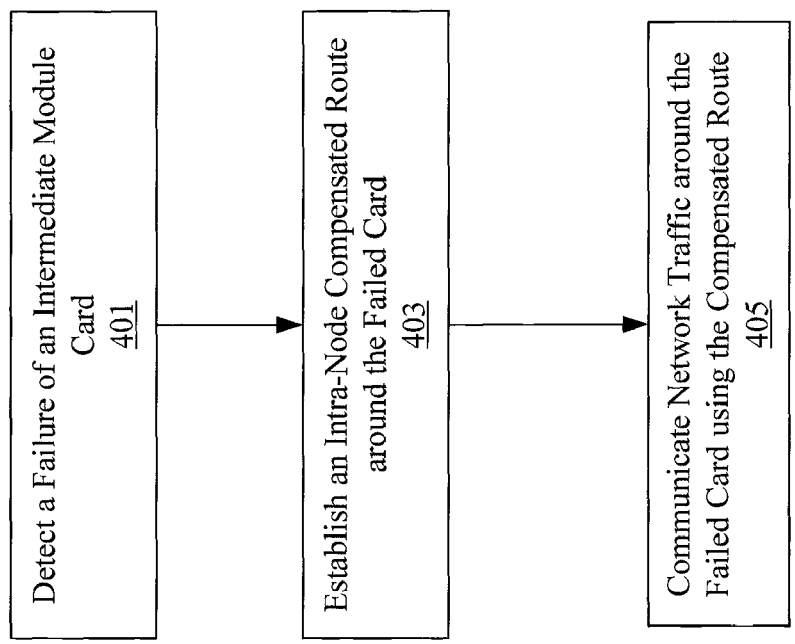
FIG. 4 shows a flowchart illustrating a method for dynamic intra node rerouting according to one embodiment of the invention.

A general method, independent of structure, of dynamic intra-node rerouting is described in relation to FIG. 4. The method, as well as other methods contemplated herein, may be performed via a computer program product embodied on a non-transitory computer readable medium. As previously discussed, a network node operates in receiving and transmitting traffic on multiple network connections. This routing of traffic signals includes receiving traffic on a first DLM card, internally switching the traffic within the node, and transmitting the traffic on a second DLM card. It is important to note that the first and second DLM cards may actually be the same card depending on the configuration of the particular connection.

In one embodiment of the invention, a first module card may receive a signal, which needs to be routed through the network node. After receiving the signal at a first module card, the signal may be transmitted through an intermediate module card to an intended second module card for transmission of the signal onto the network. This transmission of the signal between the first and second module cards may be done through a series of cross-connections. For example, the transmission between the first module card and an intermediate module may be accomplished via a direct peer cross-connection. During the normal functioning of the communication between first module card and the second module card, this route is continuously used.

A failure may occur on one or more of the module cards resulting in the route being broken. In one embodiment of the invention, the intermediate module card may be detected 401 as failing and a dynamic intra node rerouting procedure is initiated. The active communication utilizing the intermediate module card, which has failed, may be momentarily affected.

On detection of the fault on the intermediate module card, a compensated route may be established 403, which directs traffic around the failed intermediate module card. The compensated route may comprise one or more cross-connections, which do not involve the failed module card. In one embodiment of the invention, a node controller may be employed that senses a failed module card and establishes a compensate route.

The signals for communication between the first module card and the second module card may thus be communicated 405 through the compensated route. Since, the compensated route is established within the network node the recovery time associated is minimal.

Figure 5A:
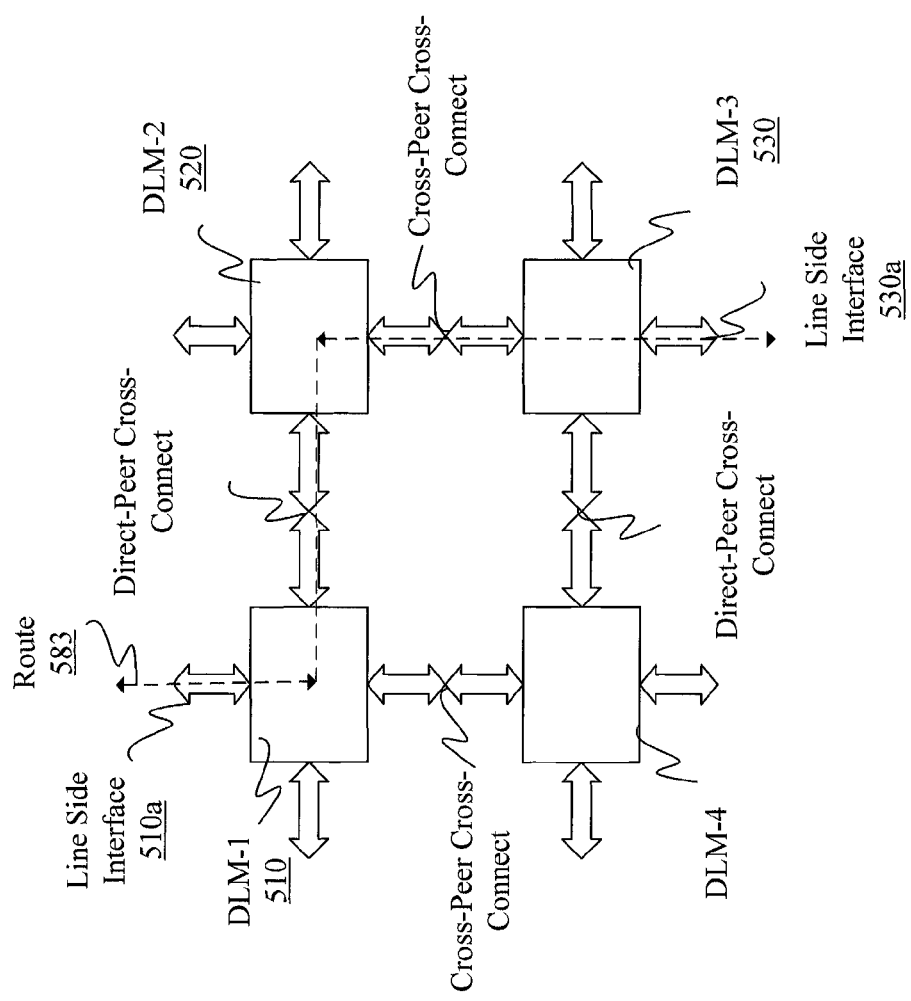
FIGS. 5A and 5B show an exemplary implementation of the method of dynamic intra node rerouting in a network node according to one embodiment of the present invention.
Figure 5B:
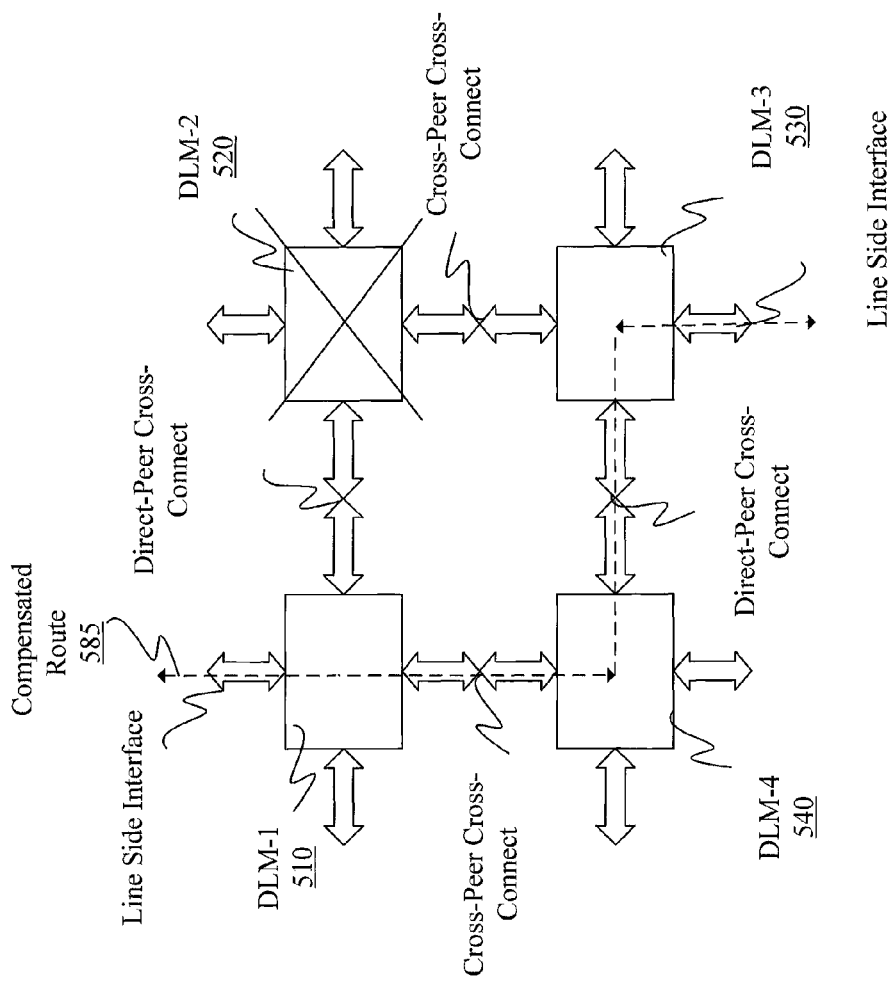

FIGS. 5A and 5B show an exemplary implementation of the method of dynamic intra node rerouting according to one embodiment of the present invention. For purposes of this and subsequent examples, a module card is illustrated as a DLM card but is intended to include all types of networking line cards.

A module card-1 510 receives an input signal through a line side interface 510*a*. The received signal is routed to another card such as the line side interface 530*a* at module card-3 530 via an initial route 583. This initial route 583 is initiated at the module card-1 510 and continues to a module card-2 520, which may further transmit the signal to the module card-3 530. The module card-2 520 thus acts as an intermediate module card in the transmission of signal from module card-1 510 to the module card-3 530.

In event of a failure on module card-2 520, a compensated route 585 is created as shown in FIG. 5B. The signal transmission from the module card-1 510 may be rerouted to a module card-4 540 on the compensated route 585. The signal may then further be transmitted from the module card-4 540 to the module card-3 530. The established compensated route 585 may also be used for transmission of signals from the module card-3 530 to the module card-1 510. Thus, setting up a new communication channel between the module card-3 530 and module card-1 510.

The module card-4 540 thus acts as an auxiliary module card for the transmission of signal from the source module card-1 510 to the destination module card-3 530 in the compensated route 585.

Figure 6A:
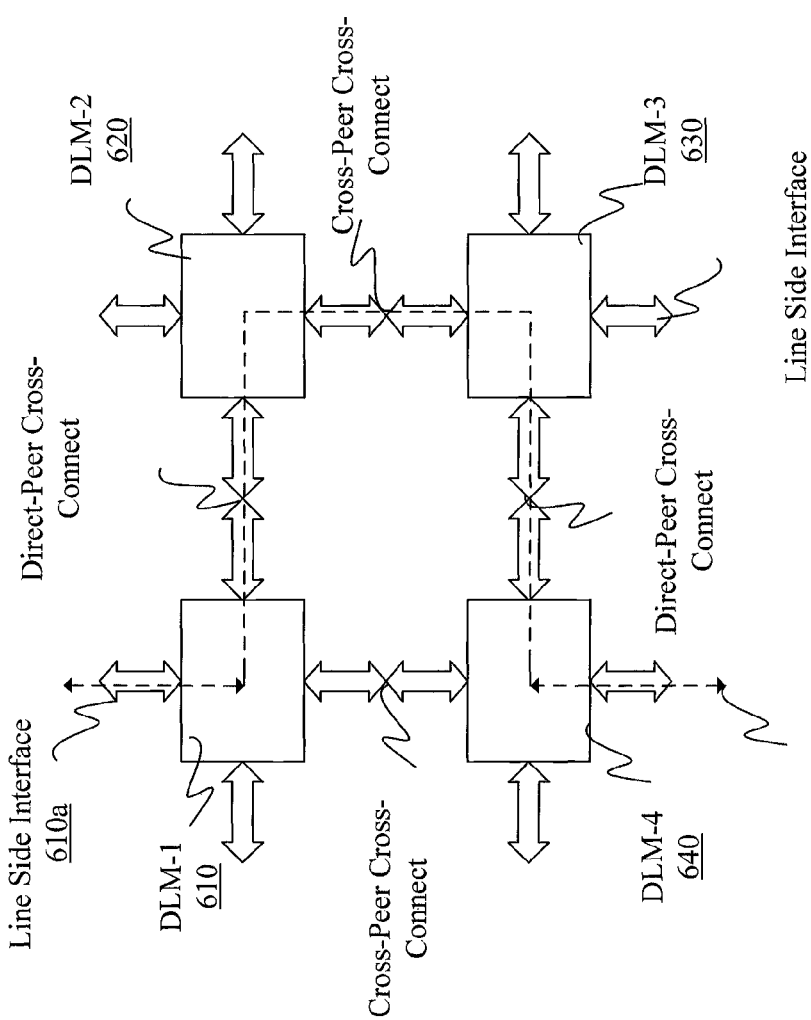
FIGS. 6A and 6B show another exemplary implementation of the method of dynamic intra node rerouting in a network node according to one embodiment of the present invention.
Figure 6B:
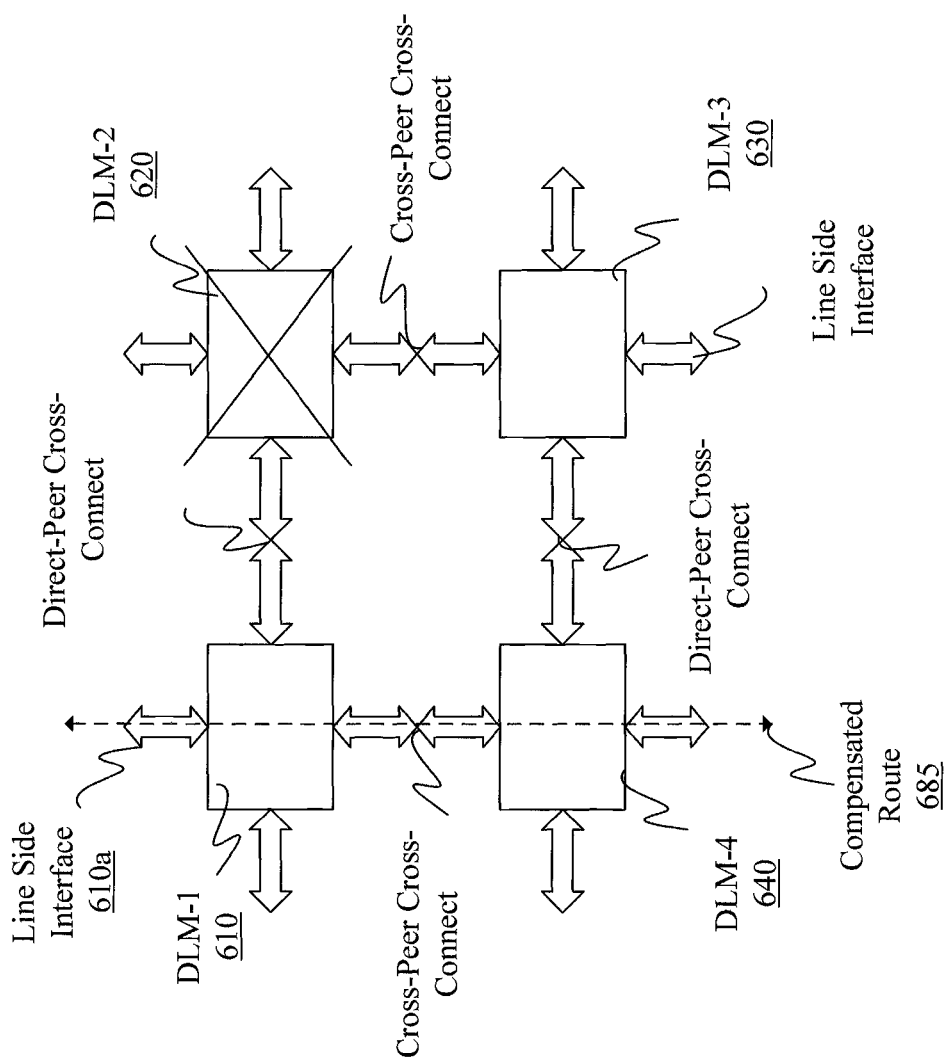

FIGS. 6A and 6B show another exemplary implementation of the method of dynamic intra node rerouting according to one embodiment of the present invention. The module card-1 610 receives an input signal through a line side interface 610*a*. The signal is routed from the source module card-1 610 to a destination module card-4 640 on an initial route 683 as shown in FIG. 6A. This initial route 683 between module card-1 610 and module card-4 640 includes multiple intermediary module cards, specifically module card-2 620 and module card-3 630.

The signal from the module card-1 610 is effectively transmitted over two intermediary cards 620, 630 before its destination module card-4 640 is reached. Upon detection of a failure at one or both of the intermediate module cards (such as the module card-2 620), a dynamic rerouting of the signal takes place by establishing a compensated route 685 as shown in FIG. 6B. Specifically, the signal is diverted away from the failed module card-2 620 and transmitted from the module card-1 610 to the module card-4 640 on the compensated route 685.

By providing fault correction and recovery at a relatively lower level on the network (i.e. at the intra-node level), a quick healing of the network fault events is provided. This quick healing internally compensates for the failed node which minimizes the recovery steps on other nodes within the sub-network connection.

While the present invention has been described with reference to certain exemplary embodiments, those skilled in the art will recognize that various modifications may be provided. Accordingly, the scope of the invention is to be limited only by the following claims.

What is claimed is:

1. A method for fault recovery, the method comprising:
establishing a first connection comprising first, second, and third ones of a plurality of line cards between a first port and a second port, each of the plurality of line cards including a corresponding one of a plurality of line side interfaces, each of the plurality of line side interfaces configured to communicate with a corresponding one of a plurality of nodes within a network, the first port associated with the first one of the plurality of line cards and the second port associated with the third one of the plurality of line cards, the first one of the plurality of lines cards coupled to the second one of the plurality of line cards via a first cross-connect, the second one of the plurality of line cards further coupled to the third one of the plurality of line cards via a second cross-connect;
detecting a failure of the second one of the plurality of line cards;
establishing a second connection comprising the first and third ones of the plurality of line cards, and a fourth one of the plurality of line cards between the first port and the second port, the first of the plurality of line cards being further coupled to the fourth one of the plurality of line cards via a third cross-connect, the fourth one of the plurality of line cards further coupled to the third one of the plurality of line cards via a fourth cross-connect; and
transmitting network traffic between the first port and the second port on the second connection,
wherein the first one of the plurality of line cards is configured to receive a first data stream at a first data rate and output the first data stream at the first data rate, the first one of the plurality of line cards also being configured to receive a second data stream at a second data rate and output the second data stream at the second data rate, the first data rate being different than the second data rate.

2. The method of claim 1 wherein the line side interface of the third one of the plurality of line cards includes the second port.

3. The method of claim 1 wherein a node controller that monitors traffic on the first and second ports performs the failure detection.

4. The method of claim 3 wherein the node controller identifies the second connection in response to the failure in the first connection.

5. The method of claim 1 wherein the first cross-connect operates at the first data rate and the second cross-connect operates at the second data rate that is different than the first data rate.

6. The method of claim 1 wherein the line side interface of the first one of the plurality of line cards includes the first port.

7. The method of claim 5 wherein the third cross-connect operates at the second data rate and the fourth cross-connect operates at the first data rate.

8. A network node comprising:
    first, second, third, and fourth, line cards, each including a line side Interface configured to communicate with another network node within a network, the first line card including a first port, the first port configured to receive a network signal, the second line card configured to receive the network signal from the first line card via a first cross-connect, the third line card including a second port, the third line card configured to receive the network signal from the second line card via a second cross-connect, the second port configured to transmit the network signal;
    a first connection provided between the first and second ports, the first connection comprising the first, second, and third line cards, and the first and second cross-connects; and
    a node controller, coupled to monitor the network signal on the first connection, that detects a failure within the first connection and creates a second connection around the failure comprising the first line card, the fourth line card, and
    the third line card, and third and fourth cross-connects, the second connection being provided between the first and second ports, the fourth line card configured to receive the network signal from the first line card via the third cross-connect and provide the signal to the third line card via the fourth cross-connect,
    wherein the first line card is configured to receive a first data stream at a first data rate and a second data stream at a second data rate, the first line card also being configured to output the first data stream at the first data rate and the second data stream at the second data rate, the first data rate being different than the second data rate.

9. The network node of claim 8 wherein the first cross-connect operates at the first data rate and the second cross-connect operates at the second data rate that is different than the first data rate.

10. The network node of claim 8 wherein the first cross-connect is a direct-peer cross-connect.

11. The network node of claim 8 wherein the second cross-connect is a cross-peer cross-connect.

12. The network node of claim 9 wherein the third cross-connect operates at the second data rate and the fourth cross-connect operates at the first data rate.

13. A computer program product embodied on a non-transitory computer readable medium, the computer program product comprising computer instructions for:
    establishing a first connection comprising first, second, and third ones of a plurality of line cards between a first port and a second port, each of the plurality of line cards including a corresponding one of a plurality of line side interfaces, each of the plurality of line side interfaces configured to communicate with a corresponding one of a plurality of nodes within a network, the first one of the plurality of line cards coupled to the second one of the plurality of line cards via a first cross-connect, the second one of the plurality of line cards further coupled to the third one of the plurality of line cards via a second cross-connect;
    detecting a failure of the second one of the plurality of line cards;
    establishing a second connection comprising the first and third ones of the plurality of line cards, and a fourth one of the plurality of line cards between the first port and the second port, the first one of the plurality of line cards further coupled to the fourth one of the plurality of line cards via a third cross-connect, the fourth one of the plurality of line cards further coupled to the third one of the plurality of line cards via a fourth cross-connect; and
    transmitting network traffic between the first port and the second port on the second connection,
    wherein the first one of the plurality of line cards is configured to receive a first data stream at a first data rate and output the first data stream at the first data rate, the first one of the plurality of line cards also being configured to receive a second data stream at a second data rate and output the second data stream at the second data rate, the first data rate being different than the second data rate.

14. The computer program product of claim 13 wherein the line side interface of the third one of the plurality of line cards includes the second port.

15. The computer program product of claim 13 wherein the first cross-connect operates at the first data rate and the second cross-connect operates at the second data rate that is different than the first data rate.

16. The computer program product of claim 15 wherein the third cross-connect operates at the second data rate and the fourth cross-connect operates at the first data rate.

17. A method for fault recovery, the method comprising:
    establishing a first connection comprising first, second, third, and fourth ones of a plurality of line cards between a first port and a second port, each of the plurality of line cards including a corresponding one of a plurality of line side interfaces, each of the plurality of line side interfaces configured to communicate with a corresponding one of a plurality of nodes within a network, the first port associated with the first card and the second port associated with the fourth card, the first one of the plurality of line cards coupled to the second one of the plurality of line cards via a first cross-connect, the second one of the plurality of line cards further coupled to the third of the plurality of line cards via a second cross-connect, the third one of the plurality of line cards further coupled to a fourth one of the plurality of line cards via a third cross-connect;
    detecting a failure of one of the second or third of the plurality of line cards;
    establishing a second connection comprising the first and fourth ones of the plurality of line cards between the first port and the second port, the first one of the plurality of line cards further coupled to the fourth one of the plurality of line cards via a fourth cross-connect; and
    transmitting network traffic between the first port and the second port on the second connection,
    wherein the first one of the plurality of line cards is configured to receive a first data stream at a first data rate and output the first data stream at the first data rate, the first one of the plurality of line cards also being configured to receive a second data stream at a second data rate and output the second data stream at the second data rate, the first data rate being different than the second data rate.

18. The method of claim 17 wherein the line side interface of the fourth one of the plurality of line cars includes the second port.

19. The method of claim 17 wherein a node controller that monitors traffic on the first and second ports performs the failure detection.

20. The method of claim 19 wherein the node controller identifies the second connection in response to the failure in the first connection.

21. The method of claim 17 wherein the first cross-connect operates at the first data rate and the second cross-connect operates at the second data rate.

22. A network node comprising:
   first, second, third, and fourth line cards, each including a line side interface configured to communicate with another network node within a network, the first line card including a first port, the first port configured to receive a network signal, a second line card configured to receive the network signal from the first line card via a first cross-connect, the third line card configured to receive the network signal from the second line card via a second cross-connect; the fourth line card including a second port, the fourth line card configured to receive the network signal from the third line card via a third cross-connect;
   a first connection provided between the first and second ports, the first connection comprising the first, second, third, and fourth line cards, and the first, second, and third cross-connects; and
   a node controller, coupled to monitor the network signal on the first connection, that detects a failure within the first connection and creates a second connection around the failure comprising the first and fourth line cards, and a fourth cross-connect, the second connection being provided between the first and second ports, the fourth line card configured to receive the network signal from the first line card via the fourth cross-connect,
   wherein the first line card is configured to receive a first data stream at a first data rate and a second data stream at a second data rate, the first line card also being configured to output the first data stream at the first data rate and the second data stream at the second data rate, the first data rate being different than the second data rate.

23. The network node of claim 22 wherein the first cross-connect operates at the first data rate and the second cross-connect operates at the second data rate that is different than the first data rate.

24. The network node of claim 23 wherein the third cross-connect operates at the first data rate and the fourth cross-connect operates at the second data rate.

25. The network node of claim 22 wherein the first cross-connect is a direct-peer cross-connect.

26. The network node of claim 25 wherein the second cross-connect is a cross-peer cross-connect.

* * * * *